(12) United States Patent
Donnelly et al.

(10) Patent No.: US 7,883,839 B2
(45) Date of Patent: Feb. 8, 2011

(54) METHOD AND APPARATUS FOR NANO-PANTOGRAPHY

(75) Inventors: Vincent M Donnelly, Houston, TX (US); Demetre J. Economou, Houston, TX (US); Paul Ruchhoeft, Houston, TX (US); Lin Xu, Houston, TX (US); Sri Charan Vemula, Leuven (BE); Manish Kumar Jain, Houston, TX (US)

(73) Assignee: University of Houston, Houston, TX (US)

( * ) Notice: Subject to any disclaimer, the term of this patent is extended or adjusted under 35 U.S.C. 154(b) by 777 days.

(21) Appl. No.: 11/633,233

(22) Filed: Dec. 4, 2006

(65) Prior Publication Data

US 2007/0131646 A1    Jun. 14, 2007

Related U.S. Application Data

(60) Provisional application No. 60/748,541, filed on Dec. 8, 2005.

(51) Int. Cl.
*G21K 1/08* (2006.01)
*C03C 25/60* (2006.01)

(52) U.S. Cl. .............. 430/323; 250/396 R; 250/492.21; 250/309; 250/492.22; 216/66; 216/67

(58) Field of Classification Search ................ None
See application file for complete search history.

(56) References Cited

U.S. PATENT DOCUMENTS

| | | | |
|---|---|---|---|
| 3,619,608 A | 11/1971 | Westerberg | |
| 4,465,934 A | 8/1984 | Westerberg et al. | |
| 5,378,917 A | 1/1995 | Chalupka et al. | |
| 6,867,443 B2 | 3/2005 | Liu et al. | |
| 6,914,620 B2 | 7/2005 | Yoshida et al. | |
| 6,919,952 B2 | 7/2005 | Kruit | |
| 7,005,378 B2 | 2/2006 | Crocker, Jr. et al. | |
| 7,091,504 B2 | 8/2006 | Wieland et al. | |
| 7,109,493 B2 * | 9/2006 | Eastham | .......... 250/396 R |
| 7,118,784 B1 | 10/2006 | Xie | |
| 7,122,827 B2 | 10/2006 | Alizadeh et al. | |

OTHER PUBLICATIONS

Donnelly et al., Nano-pantography, Dec. 13-15, 2004, NSF Nanoscale Science and Engineering Grantees Conference, NSF NIRT GRANT DMI0303790, pp. 1-3.*
Xu, et al, "Extraction of a nearly monoenergetic ion beam using a pulsed plasma", 87 Appl. Phys. Lett. (2005), pp. 041502.
Xu, et al., "Nanopantography: A New Method for Massively Parrallel Nanopatterning over Large Areas", 5(12) nano Letters (2005), pp. 2563-2568.
Murray, J., Characteristics and Applications of Multiple Beam Machines, 9 Microelectronic Eng. (1989), pp. 305-309.
Ando, et al., "Preliminary experimental study of the multiple ion beam machine", 6(6) J. Vac. Sci. Tech. B (1988), pp. 2120-2123.
Brodie, et al., "A Multiple-Electron-Beam Exposure System for High-Throughput, Direct-Write Submicrometer Lithography", 28(11) IEEE Transactions on Electron Devices (1981), pp. 1422-1428.
Heynick, et al., "Projection Electron Lithography Using Aperture Lenses", 22 (7) (1975), pp. 399-409.

* cited by examiner

*Primary Examiner*—Daborah Chacko Davis
(74) *Attorney, Agent, or Firm*—Winstead PC (57) ABSTRACT

A method is provided for creating a plurality of substantially uniform nano-scale features in a substantially parallel manner in which an array of micro-lenses is positioned on a surface of a substrate, where each micro-lens includes a hole such that the bottom of the hole corresponds to a portion of the surface of the substrate. A flux of charged particles, e.g., a beam of positive ions of a selected element, is applied to the micro-lens array. The flux of charged particles is focused at selected focal points on the substrate surface at the bottoms of the holes of the micro-lens array. The substrate is tilted at one or more selected angles to displace the locations of the focal points across the substrate surface. By depositing material or etching the surface of the substrate, several substantially uniform nanometer sized features may be rapidly created in each hole on the surface of the substrate in a substantially parallel manner.

21 Claims, 11 Drawing Sheets

AFM IMAGE

Fig. 9A

SEM IMAGE 20 nm

METHOD AND APPARATUS FOR NANO-PANTOGRAPHY

CROSS-REFERENCE TO RELATED APPLICATIONS

This application claims priority to U.S. Provisional Patent application Ser. No. 60/748,541, filed Dec. 8, 2005.

GOVERNMENTAL SPONSORSHIP

This invention was made with government support under University of Houston account number 5-51-956 awarded by the National Science Foundation.

FIELD OF THE INVENTION

This invention pertains to a method and apparatus for forming nano-patterns and nano-features, and more specifically, to a system and method for massively parallel replication of 2-D or 3-D nanometer-sized patterns of a wide variety of materials over a large area.

BACKGROUND OF THE INVENTION

Current focused ion beam techniques are capable of writing nanometer-sized features but are very slow. Existing methods for making small features consist of lithographically defining polymeric resist materials and then transferring the developed pattern into the desired underlying film or substrate by plasma etching.

State-of-the-art immersion lithography can produce features as small as 45 nm, but is complex and costly. Ion beam or electron beam proximity or projection lithography methods are capable of much finer resolution (e.g., features sized in the tens of nm), but require expensive and fragile masks. Some of the finest features may be made by electron beam writing into resist. While this method is very good for prototype devices, it is not practical for large-scale fabrication and production because the writing speed is much too slow to cover a several square centimeters chip size area in a reasonable time.

Another approach to making devices with nanometer sized features is to use self-assembled monolayers (SAMs). SAMs with micron sized feature can be delineated by lithography or stamping; while complex patterns with nanometer-size features can be fabricated with block copolymers. Unfortunately, SAMs are limited in terms of possible patterns and materials and are therefore unsuitable for large scale nanofabrication.

It is therefore desirable to circumvent the aforementioned limitations and provide a method of fabricating 2-D or 3-D shape patterns in a wide variety of materials over large areas. It is a further object of the present invention to provide a method that is largely unaffected by vibrations, thermal expansion and other alignment problems that usually plague other nanofabrication methods.

SUMMARY OF THE INVENTION

The present invention utilizes nano-pantography to provide high-throughput, versatile, and large scale fabrication of nanometer-sized complex patterns over large surface areas by simultaneously focusing a broad ion beam with micro-electrostatic lenses on the substrate. When the wafer is tilted off normal (with respect to the ion beam axis), the focal point is laterally displaced, allowing the focused beams to be rastered, thus forming a desired pattern. The desired pattern can be replicated simultaneously in potentially millions of spots over tens of square centimeters.

A method is provided for creating a plurality of substantially uniform nanometer-sized features in a substantially parallel manner in which an array of micro-lenses is positioned on a surface of a substrate, where each micro-lens includes a hole such that the bottom of the hole corresponds to a portion of the surface of the substrate. A flux of charged particles, e.g., a beam of positive ions of a selected element, is applied to the micro-lens array. The flux of charged particles is focused at selected focal points on the substrate surface at the bottoms of the holes of the micro-lens array. The substrate is tilted at one or more selected angles to displace the locations of the focal points across the substrate surface in accordance with the feature to be mass produced. By depositing material or etching the surface of the substrate at the focal points as they move across the substrate surface in a substantially parallel fashion, several substantially uniform nanometer sized features may be created on the surface of the substrate in a substantially parallel manner.

BRIEF DESCRIPTION OF THE DRAWINGS

FIG. 3b is a top view illustrating the exemplary embodiment of the micro-lens array of the nano-pantography system of FIG. 3a.

DESCRIPTION OF THE PREFERRED EMBODIMENTS

The present invention relates to a method for simultaneously forming several two or three dimensional and identical nanometer-sized features of a wide variety of materials over a large area. For the purpose of this disclosure, the term nanometer-sized features means nano-scale features, e.g., features smaller than approximately 1 micron and at least approximately 1 nm. In certain applications, the present invention may be used to simultaneously form millions of identical nanometer-sized patterns. In an exemplary embodiment of the invention, nano-pantography can be used to etch patterns as well as to deposit patterned films at the nanometer scale with as much as a 100-fold reduction relative to the lens size. Certain exemplary embodiments of the nano-pantography method and system disclosed herein are generally capable of pattern resolutions of about 10 nanometers (nm). The nano-pantography method and system disclosed herein may be generally capable of rapidly providing mass produced nano-patterning over a relatively large area such that the smallest lateral dimension of a feature may be as small as approximately 1 nm.

General Principles of Nano-Pantography

Figure 1A:
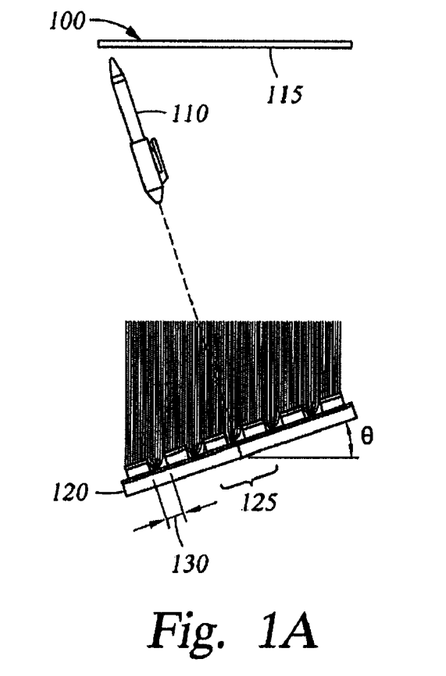
FIGS. 1a-c are side views illustrating the nano-pantography method.
Figure 1B:
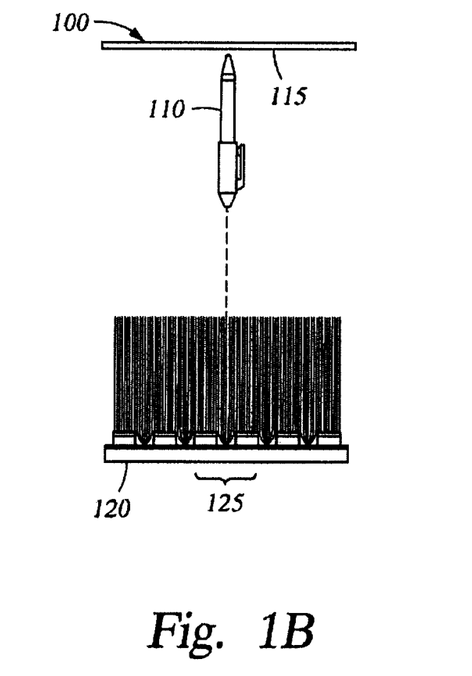
Figure 1C:
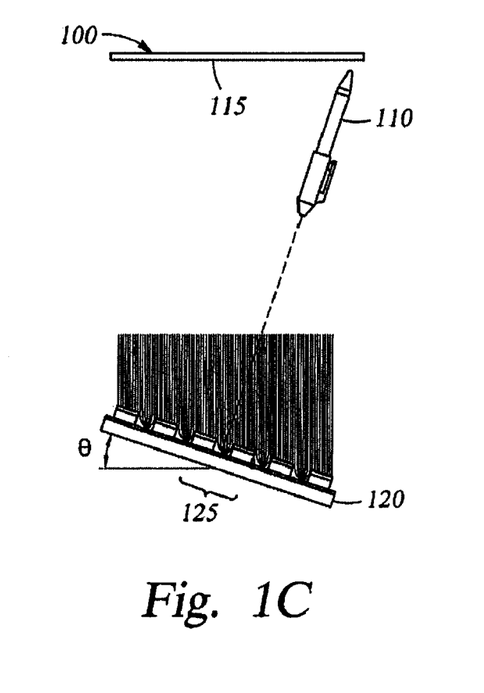

As used herein, pantography refers to the reproduction of a model into identical copies of either larger or smaller sizes. The present invention is a method and apparatus for applying the general principles of pantography to nanometer sized patterns. FIGS. 1a-d illustrate the general concept of nano-pantography. As shown in FIG. 1a-c, nano-pantography allows a user to simultaneously reproduce a pattern or model, shown at 115, that is initially engraved on the imaginary plane 100 onto a substrate 120 in many identical copies 125. Substrate 120 contains several electrostatic micro-lenses or apertures, 130. Each copy is engraved onto substrate 120 through a corresponding lens 130. The shape of the model 115 and copies 125 are identical but their respective sizes may be different.

The fountain pen 110 in FIG. 1b illustrates the concept of "writing" a model 115 on an imaginary plane 100 initially parallel to the substrate 120 at a selected distance, e.g., one meter apart. In this example, model 115 is a simple straight line. The motion of the pen 110 corresponds to the motion of an axis normal to the substrate 120 as that substrate 120 is titled. The model can be reproduced on the substrate 120 in such a way that the copies 125 are reduced by a factor of up to one million.

Figure 1D:
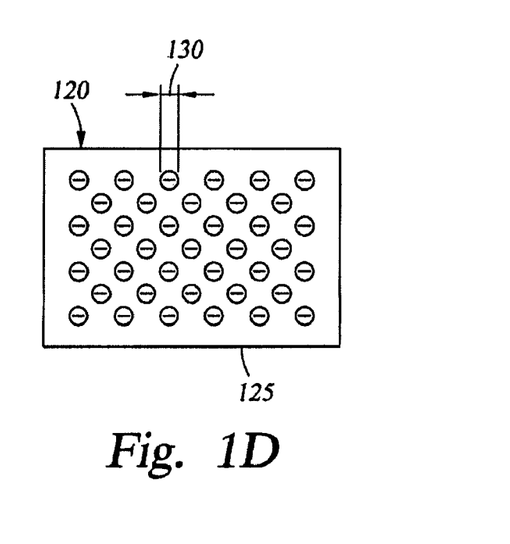
FIG. 1d is a top view of the nano-pantography method.

An example of the results of nano-pantography is illustrated in FIG. 1d. By tilting the substrate 120 from left to center to right, as shown in FIG. 1a-c, a user can write a straight line 125 at the bottom of the holes of lenses 130, e.g., on the substrate 120. In fact, by tilting the substrate 120 at appropriate angles in three dimensions, shown as angle θ, a user can simultaneously reproduce models 115 having any selected shape in many copies 125. The final individual copies 125 can be as small as a few nanometers in size.

Examples of Nano-Pantography for Massive Nano-Patterning Over Large Areas

Nano-pantography allows versatile fabrication of nanometer scale pre-selected patterns over large areas. Standard photolithography, thin film deposition, and etching may be used to fabricate arrays of ion-focusing micro-lenses (e.g., small round holes through a metal/insulator structure) on a substrate, such as a silicon wafer, for example. When the substrate is tilted off normal with respect to the ion beam axis, the focal points in each hole are laterally displaced, allowing the focused beamlets to be rastered across the hole bottoms. In the nano-pantography process, the desired pattern is replicated simultaneously in many closely spaced holes over an area limited only by the size of the broad-area ion beam. With the proper choice of ions and downstream gaseous ambient, the method can be used to deposit or etch materials.

For example, the simultaneous impingement of an $Ar^+$ beam and a $Cl_2$ effusive beam on an array of 950 nm diameter lenses can be used to etch 10 nm diameter features into a Si substrate, which corresponds to a reduction by a factor of approximately 95 times relative to the lens size. The focused "beamlet" diameters scale directly with lens diameter. Thus a minimum feature size of ~1 nm should be possible with 90 nm diameter lenses. This resolution capability generally exceeds conventional photo-lithography techniques. The system and method of the present invention is suitable for overcoming one of the main obstacles in practical nano-scale fabrication: providing rapid, large-scale fabrication of virtually any shape and material nanostructures. Because ion focusing optics may be built on the substrate itself, the nano-pantography system and method of the present invention is a self aligned method that is substantially unaffected by vibrations, thermal expansion, and other alignment problems that usually plague other standard nanofabrication methods.

Figure 2:
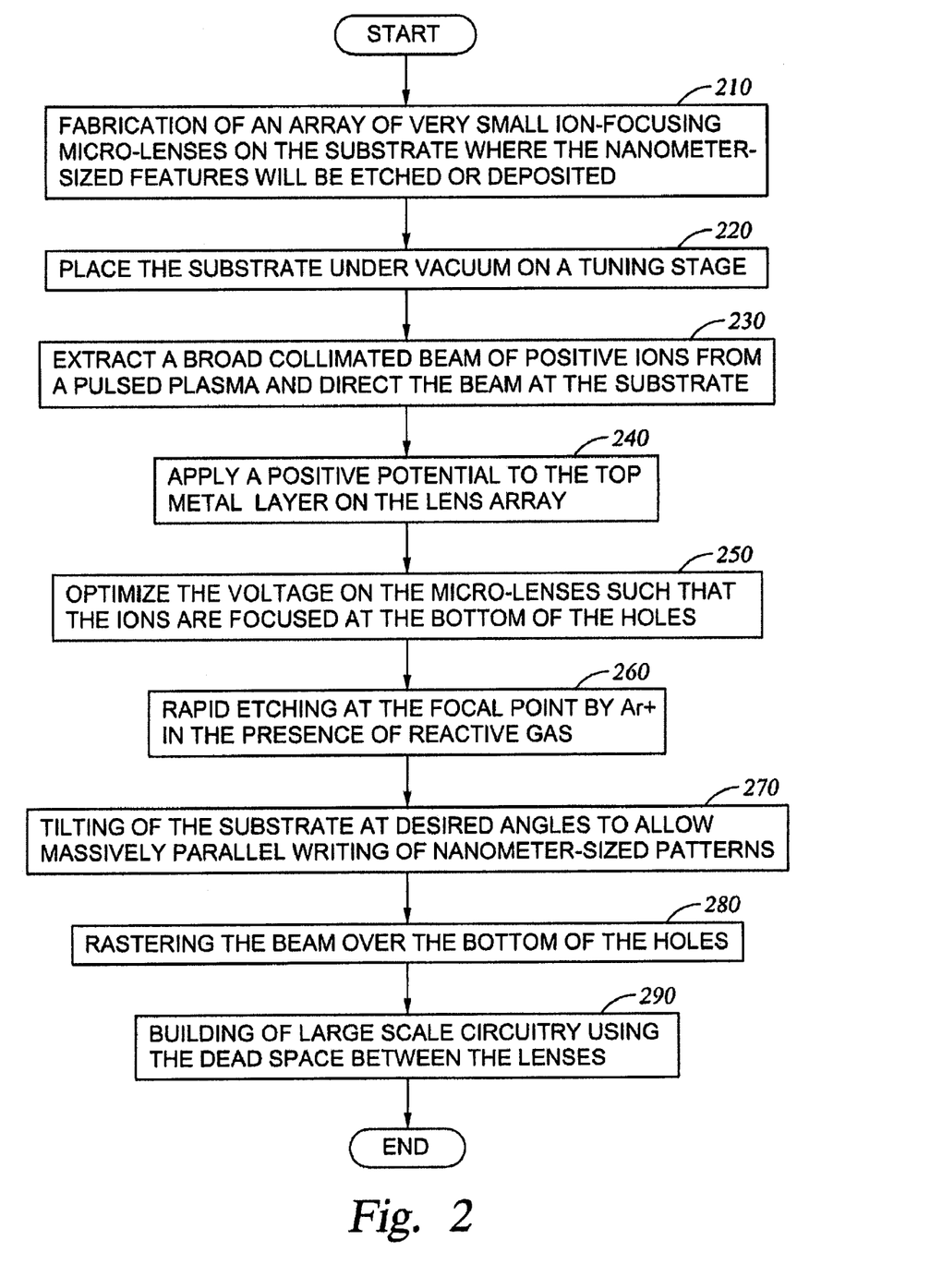
FIG. 2 is a flow chart illustrating the method of the present invention.

FIG. 2 illustrates an exemplary embodiment of the method of nano-pantography. At step 210, an array of very small ion-focusing micro-lenses is fabricated on the substrate where the nanometer size features need to be etched or deposited. The micro-lenses are preferably electrostatic micro-lens. The substrate is then placed under vacuum on a stage that allows fine tuning of the sample position in space in three dimensions, at step 220. Next, at step 230, a broad area collimated beam of positive ions is extracted from a pulsed plasma and directed at the substrate. A positive voltage is applied to the top metal layer on the lens array at step 240. In response to the application of voltage, the ions are focused at the bottoms of the holes at step 250. The voltage on the micro-lenses may be optimized through experiments and simulations to allow the ions to focus at the correct distance. At the focal points, inert ions such as $Ar^+$ can be made to cause rapid etching in the presence of reactive gas, at step 260, while metal ions sputtered from a target electrode can be extracted and deposited at energies below the sputtering threshold. As an example of the method illustrated in FIG. 2, simultaneous impingement of an $Ar^+$ beam and a $Cl_2$ effusive beam on an array of 950 nm diameter lenses can be used to etch 10 nm diameter features into a Si substrate, a reduction of 95 times.

At step 270, the substrate is tilted at desired angles to allow for parallel writing of multiple nanometer-sized patterns at substantially the same time. This embodiment of the invention is able to form multiple simultaneous nanometer-sized patterns, because, in part, the focal point of the ion beam is displaced when the ion beam axis is moved off normal with respect to the substrate. The line normal to the substrate intersects an imaginary horizontal plane at a selected distance from the substrate, e.g., a distance of about one meter from the substrate. As the wafer is tilted, the normal traces a pattern on the imaginary plane. Any pattern could be replicated by the ions that focus at the bottom of the holes, with a reduction by a factor of about $10^6$. In this manner, any desired pattern may be replicated by tilting the wafer at chosen angles and rastering the beam over the bottom of the holes, as shown at step 280. As a result, predetermined patterns can be formed simultaneously at the bottom of a large number of holes.

Given the flexibility of the present process of nano-pantography, a large number of nanometer-sized features may be produced on the substrate. For example, these features may range from simple patterns, such as nanodots, to complex formations including, but not limited to, nanowires, nanotubes, nanodevices and nanocircuits. Moreover, the present process of nano-pantography allows the user to select a wide variety of materials for the substrate and the nanometer-sized features. In addition, the method and system disclosed herein may be generally capable of rapidly providing mass produced nanometer sized features over a relatively large area such that the smallest lateral dimension of a feature may range in size from approximately 1 nm to approximately 50 nm.

The dead space between lenses is also available for large scale circuitry, which may be formed by conventional lithographic methods, to address and control discrete nano-devices or nano-circuits inside the holes. This is shown at step 290. In addition, because the lenses are mounted on the wafer, there is no need for the critical alignment and vibration control that is required for the alternative approach of projection of multiple focused ion beams onto a scanned substrate.

The exemplary embodiment illustrated in FIG. 2 utilizes a beam of positive ions. Depending on the application, the ions may be any material suitable for deposition, such as, for example, metal ions like nickel. Moreover, the selected ions may react with the substrate to form new material on the surface of the substrate at the focal points, e.g., oxidation. This reaction may facilitated by or occur in the presence of a selected gas, for example.

Furthermore, the process may utilize ions of any material suitable for etching, such as, for example, argon. Similarly, the process may use any gas suitable for etching the substrate. Although ion beams are discussed in the previous exemplary embodiment, the system and method of the present invention may utilize any flux of charged particles. Other exemplary embodiments may utilize electrons, similar to the process of e-beam assisted deposition.

In addition, depending on the desired application, exemplary embodiments of the present process may utilize simultaneous or sequential deposition of multiple metals of controlled composition. Other exemplary embodiments may utilize small metal catalyst particles, such as nickel, to grow orderly arrays of precisely positioned carbon nanotubes, for example. The process may also allow for alternating between different gasses, ions, and/or precursors to form multilayer structures. In other exemplary embodiments, the focused deposition could be followed by an unfocused "etch back" process to clear footers and other thinner imperfections around deposits and improve resolution.

One exemplary embodiments may sequentially combine the etching and depositions steps. For example, nano-holes could be etched into a substrate and then without removing the substrate from the processing chamber, the etching gas could be turned off and power could be supplied to a target electrode to focus a deposit into the holes in a self-aligned manner. In another exemplary embodiment, the size of nano deposits with Gaussian-shaped profiles may be reduced. This reduction may be accomplished by an etch-back step with an unfocussed or focused ion beam. The etch-back step may be performed in the presence of a gas that would selectively etch the nano-deposit and not the substrate. This step may remove the edges of the deposits and thus reduce their size. In another exemplary embodiment, a nano-deposited pattern could be transferred to an underlying substrate by conventional plasma etching or by broad, unfocussed ion beam-assisted etching in the presence of an appropriate gas, such as chlorine for silicon etching, for example.

Example of Fabrication and Use of Micro-Electrostatic Lenses

The ability to focus ions into the bottom of the cylindrical holes or trenches from parallel "beamlets" of a collimated, broad area ion beam is useful in carrying out the above-discussed exemplary embodiment of nano-pantography. The beamlets are comprised of the ions that enter the tops of the holes. Each hole of the array acts as a micro lens, similar (except for their small size) to electrostatic lenses used in ion focused beams or mass spectrometers. The array can take any desired pattern and thus replicate any desired patterns. Each lens contains on average only $10^{-5}$ ions. Therefore the possibility of two ions occupying a lens at the same time and repelling each other is extremely remote.

The following is an example of fabricating an array of lenses. Standard photolithography, thin film deposition, and etching methods may be used to fabricate arrays of ion-focusing micro-lenses (e.g. small round holes through a metal/insulator structure) on a substrate such as a silicon wafer. An array consists of small holes that can be arranged in any desired pattern. The micro-lens arrays may consist of circular openings in a chromium and $SiO_2$ stack on a p-type, B-doped (5-25 Ω-cm) Si substrate. The silicon is subjected to standard thermal oxidation to grow a device-quality $SiO_2$ film with a thickness of 1000 nm. A 50 nm Cr layer is deposited by electron beam evaporation, and a 200 nm thick layer of 950 kg/mol poly(methyl methacrylate) (PMMA) is spin-coated onto the chromium layer and baked at 180° C. for 1 hour.

A periodic array of circular patterns is printed using ion beam aperture array lithography. In this process, a stencil mask, containing an array of circular openings in a thin membrane, is placed in a broad beam of energetic (30 keV) helium ions. The ions are either stopped in the opaque regions of the mask or pass through the openings to form an array of ion beamlets. The beamlets are scanned across the wafer surface to expose circles of arbitrary size in the PMMA in a massively parallel fashion. The stencil mask consists of a 0.5 µm thick silicon nitride membrane with 400 nm diameter circular openings and was used to define lens structures with diameters varying from 700 to 1100 nm. The PMMA is developed in a 1:1 solution of isopropyl alcohol (IPA):methyl-isobutylketone (MIBK), rinsed in IPA, and blown dry in nitrogen. The PMMA patterns are transferred into the underlying chromium layer using a standard wet etchant (CE-8002-A, Transene Company, Inc.) maintained at 35° C. The Cr patterns act as a mask for the reactive ion etching of $SiO_2$ using 0.7 mTorr $CHF_3$ at 85W. The samples are then wet-etched in a 12.5% HF solution and rinsed in DI water to remove the native oxide on the Si and to undercut the $SiO_2$ in an effort to minimize the possibility of sidewall charging. Electrical contacts are made to the Cr layer and Si substrate. At a bias of 150V on the Cr, the leakage current is typically <0.01 mA.

Example of Ion Trajectory Simulation Results

As discussed above, during the nano-pantography process, the ions are deflected by the spatially varying potentials, and with the proper conditions come to a focus at the bottom of the hole. To obtain the best focus, ion trajectory simulations may be performed to optimize the focal characteristics of the lens.

Figure 3A:
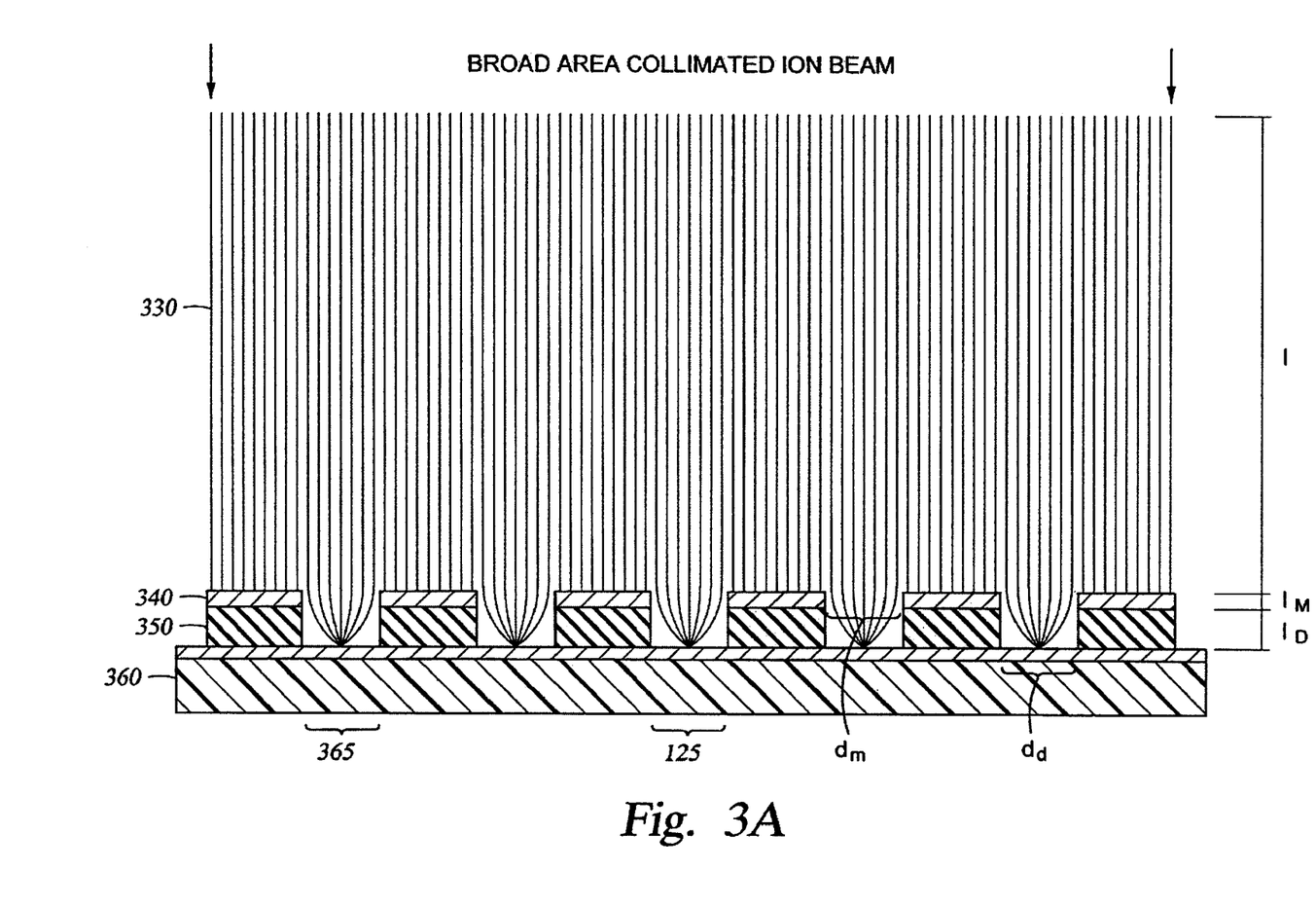
FIG. 3a is a side view of an exemplary embodiment of the micro-lens array of the nano-pantography system.
Figure 3B:
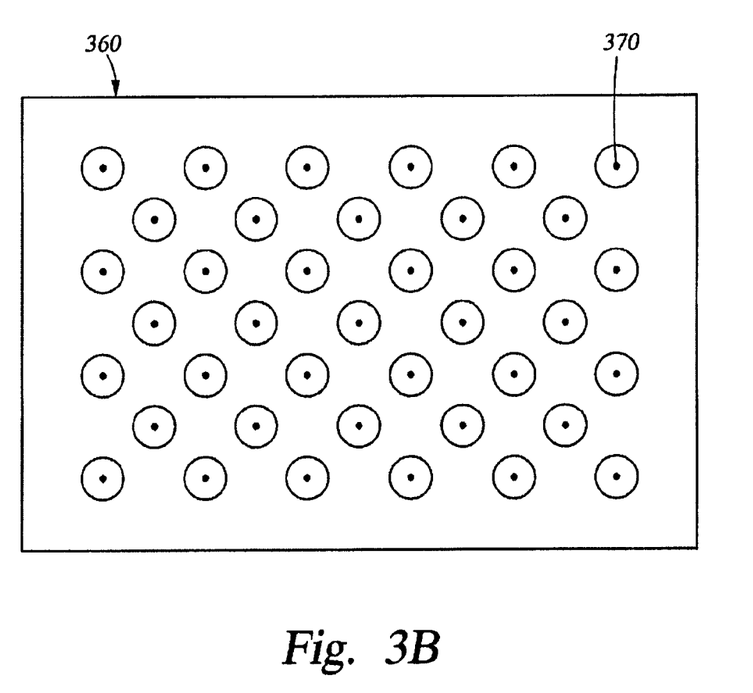

FIG. 3 illustrates an exemplary embodiment of the lens array. The single element lens depicted in FIG. 3 is one of the simplest forms of lens that may be used. FIG. 3a shows a collimated broad area ion beam 330 interfacing with substrate 360 containing micro-lens arrays 365. Substrate 360 may be (or include) a conducting film. The lens 365 are defined by apertures in grid 340 connected to substrate 360 by spacer or insulator 350. Grid 340 may be a metal electrode. Spacer 350 contains selectively sized apertures positioned with respect to the apertures of grid 340 to define lens 365. Spacer 350 may be composed of dielectric material. As discussed above, the system is preferably calibrated such that ions from ion beam 330 are substantially focused at point 335 at the bottom of lens 365. FIG. 3b is a plan view of substrate 360 showing a small region of an array of lens holes with a small feature 370 deposited or etched in the center of each hole.

Ions with a kinetic energy $E_i$ pass through the grounded grid as they exit the source plasma and travel a total distance l where they encounter a metal electrode 340 at a potential $V_m$, with a thickness $l_m$ and having a through-hole of diameter $d_m$. Ions with proper trajectories to pass through this hole then pass through a hole with a diameter $d_d$ in a dielectric material

350 of thickness $l_d$. The dimensions of the hole 365 may be accordingly defined by both $d_d$ and $d_m$. To eliminate the possibility of charging due to ions that may strike the wall, $d_d$ can be made $>d_m$.

The following example describes a lens with $l_m$=50 nm thick metal 340 resting on top of $l_d$=1000 nm thick insulator (silicon dioxide) 350 on a silicon substrate 360. The hole diameter is $d_m$=$d_d$=950 nm. The potential of the metal, $V_m$, is the control variable, while the substrate 360 is at the reference potential ($V_S$ is approximately 100 V). The volumetric charge density in the region around a single lens 365 is negligibly small. Thus, the 2-dimensional Laplace equation is used to determine the potential and electric field profiles in the domain. A uniform flux of ions is launched at the entrance plane with the measured ion energy distribution. Using the electric profile, the 3-dimensional trajectory of each ion is computed by integrating Newton's equation of motion with a leap-frog method. Integration continues until ions strike a surface.

Figure 4A:
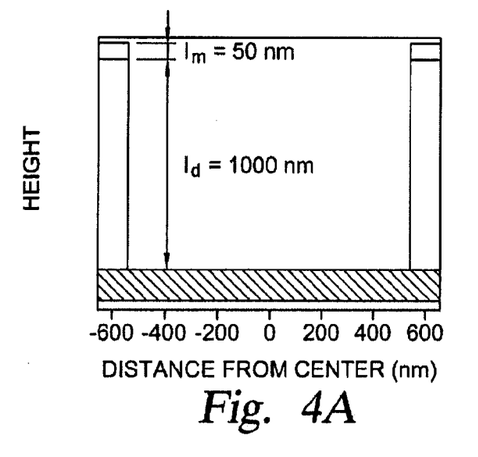
FIGS. 4a-f illustrate the simulation of relative $Ar^+$ flux as a function of distance across the bottom of a lens in an exemplary embodiment of the present invention.
Figure 4B:
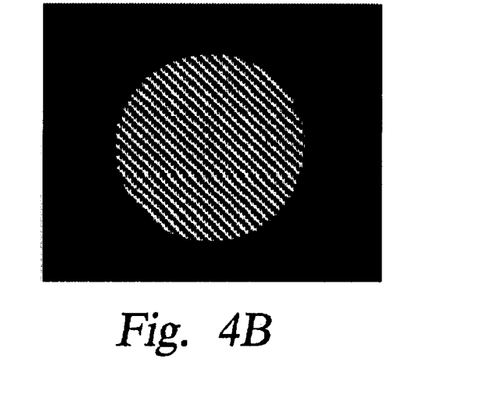
Figure 4C:
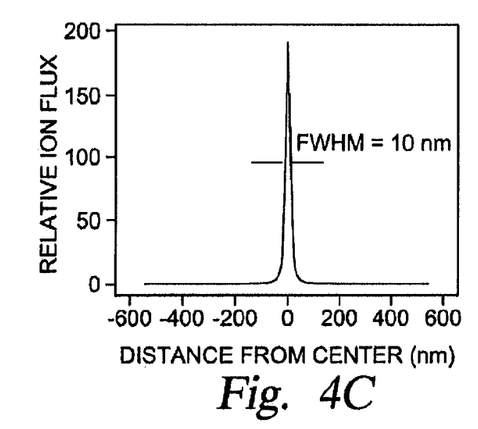
Figure 4D:
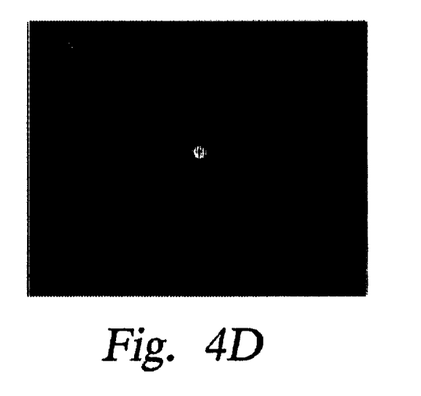
Figure 4E:
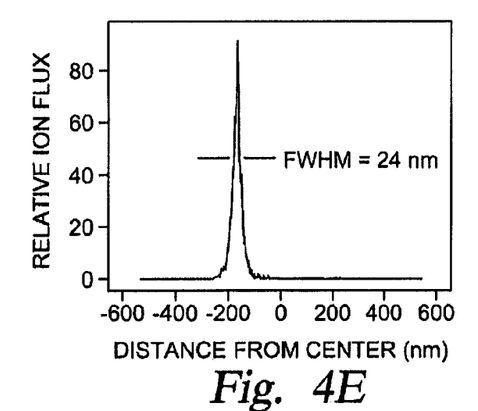
Figure 4F:
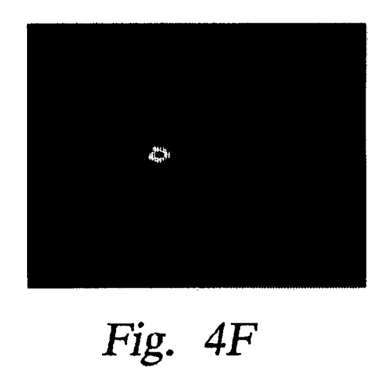

FIGS. 4a-f further illustrate this preceding example. FIGS. 4a-b illustrate the schematic of a single lens 365, where $l_m$=50 nm and $l_d$=1000 nm. FIGS. 4c and 4e show the relative ion flux as a function of the distance from the center of the lens (and corresponding to the schematic of FIG. 4a). FIGS. 4d and 4f show relative Ar$^+$ ion flux across the bottom of the lens (corresponding to FIGS. 4c and 4e, respectively). Where the ion beam axis is normal to the substrate surface, as shown in FIGS. 4c-d, the ion flux distribution along the radius at the bottom of a 950 nanometer diameter hole is sharply focused down to a full width at half maximum of 10 nm, which corresponds to a reduction factor of about 100 times compared to the hole diameter. If the ion beam axis is at an angle of 20° with respect to the surface normal, as shown in FIGS. 4e-f, the focal point is displaced by 160 nm with a full width at half maximum of 24 nm.

The lens structure may incorporate additional features beyond those shown in the exemplary embodiment depicted in FIG. 3. For example the lens structure may incorporate trench openings in the metal and insulation layers. These trench formations may allow the formation of lines, e.g., nanowires.

Example of Writing with Ion Beamlets

The following example describes a lithographically defined Cr/SiO$_2$/Si lens array with 700 to 1100 nm diameter holes exposed to a 200 eV or 100 eV Ar$^+$ and a Cl$_2$ effusive beam with an estimated Cl$_2$:Ar$^+$ flux ratio of 200:1. Under these conditions, Si may etch at a rate of 1.3 Si atoms per Ar$^+$ at E=200 eV and 0.7 Si atoms per Ar$^+$ at E=100 eV. The sputtering rate in the absence of Cl$_2$ is typically much slower (0.3 and 0.1 Si atoms per Ar$^+$ at E=200 and 100 eV, respectively). Spontaneous etching of Si by Cl$_2$ is typically very slow at room temperature. Hence, etching generally only occurs at the focal points of the Ar$^+$ beamlets.

Figure 5A:
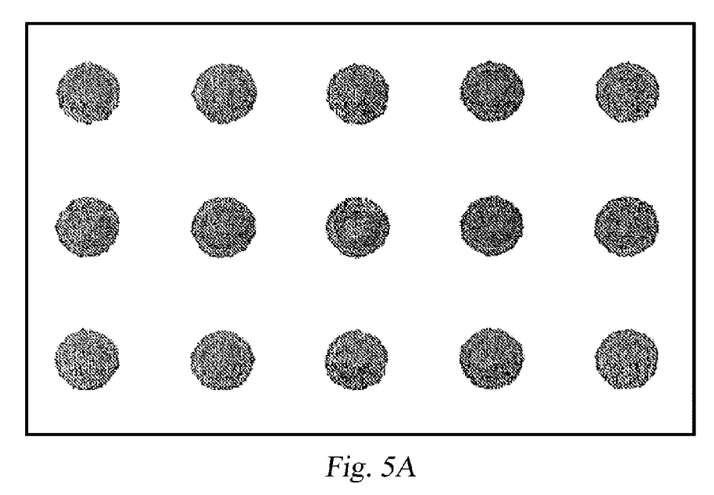
FIGS. 5a-c illustrate the scanning electron micrographs (SEM) of patterns etched into silicon wafers in accordance with an exemplary embodiment of the present invention.
Figure 5B:
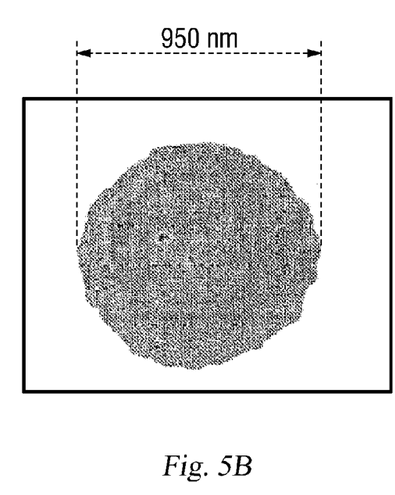
Figure 5C:
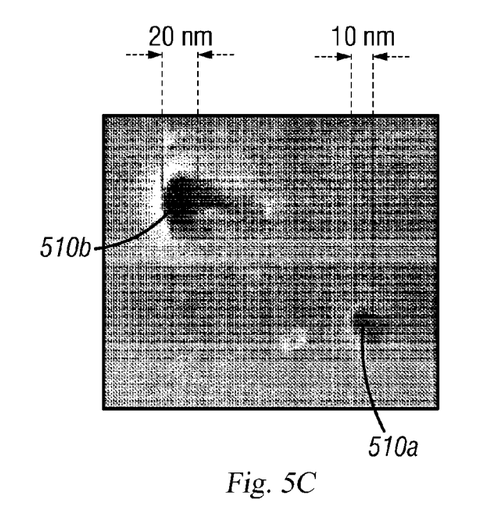

FIGS. 5a-c illustrate scanning electron micrographs (SEM) of an example pattern etched into Si with a lens array. A small portion of the array, a single lens, and two etched holes at the bottom of the lens are shown in FIGS. 5a-c. The larger (20 nm diameter) off-axis hole 510b corresponds to an estimated angle of approximately 20° between the ion beam and the wafer normal. The 10 nm diameter on-axis hole 510a corresponds to a separate etching with near normal incidence of the beam. The minimum spot size is quite sensitive to changes (±2V) in $V_m$, and to lens diameter. At the preferred voltage for a 950 nm diameter lens (196 V, with a Si substrate potential of 100 V, in this example), the beamlets focus at the center and etch holes with diameters as small as 10 nm, resulting in an approximate size reduction factor of 95 times. The SEM images are in excellent agreement with the size and shape of the on-axis as well as off-axis holes predicted from the previous example with respect to FIGS. 4c-f, discussed above.

Example of a Nano-Pantography System

Figure 6:
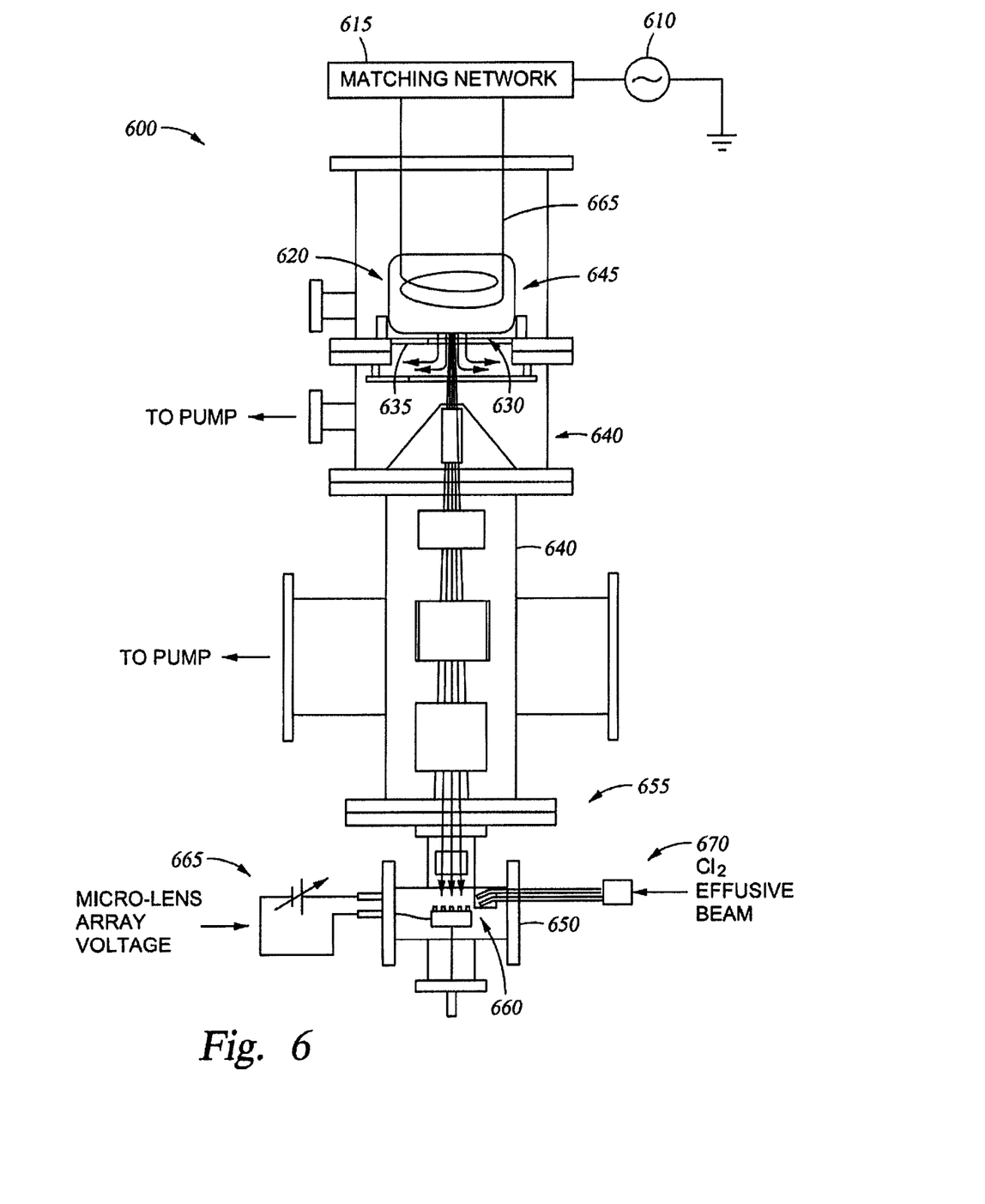
FIG. 6 shows an exemplary embodiment of the nano-pantography system.

FIG. 6 illustrates an exemplary embodiment of the nano-pantography apparatus of the present invention, indicated generally at 600. The nano-pantography apparatus consists of an ion beam source region 620, an ion "drift" region 640, and a wafer processing region 650. Source 610 provides power for apparatus 600. Source 610 is preferably a 13.56 MHz inductively-coupled plasma reactor. Matching network 615 may provide impedance matching. The radio-frequency inductive power is delivered through coil 665. Coil 665 is preferably a 3½" diameter, 2-turn coil that is immersed in the plasma. Coil 665 is preferably fabricated from ¼" o.d. nickel tubing and is water-cooled.

Ions are extracted through an extraction grid 635 at the bottom of the plasma chamber 630. The plasma is pulsed "on" and "off", preferably with a frequency of 5 kHZ and a 50% duty cycle. After plasma relaxation, a positive, constant voltage is applied to a beam acceleration ring 645 that surrounds the plasma region. The acceleration ring is preferably a 4.4" diameter, 0.3" high ring electrode. The plasma potential shifts to this applied voltage, allowing precise control over the ion beam energy. The extracted ion beam is filtered with a second grid 655, e.g., a rejection grid, located downstream that is pulsed positive to reject the beam extracted during the plasma "on" periods and pulled to ground to pass the nearly mono-energetic collimated beam extracted during the plasma "off" periods. In this exemplary embodiment of the present invention, a beam of Ar$^+$ ions (or inert gas ions) is utilized. As discussed above, however, any appropriate flux of charged particles may be used, based on the particular application or materials selected.

The sample 660 is exposed to the ion beam in a separate chamber 650. Chamber 650 is preferably 30" downstream from the extraction grid 635 of the plasma source. Micro-lens array voltage source 665 provides voltage to the lens array. For this particular exemplary embodiment, beam 670 preferably provides a Cl$_2$ effusive beam to impinge on the lens array to assist in etching the substrate. As discussed above, any appropriate gas may be used in the etching process, based on the particular application or materials selected. A drift region 640 is preferably included to reduce the angular spread of the ion beamlets that enter the micro-lens. The region 640 may also reduce the flux of neutrals, such as uncharged nickel atoms, for example, into the lens openings. Such uncharged species could deposit across most of the lens bottoms instead of predominantly at the focal points. The pressure in drift region 640 is lowered with appropriate vacuum pumps 642 to reduce the gas number density, such as only a small fraction of the ions collide with the background gas.

Figure 7:
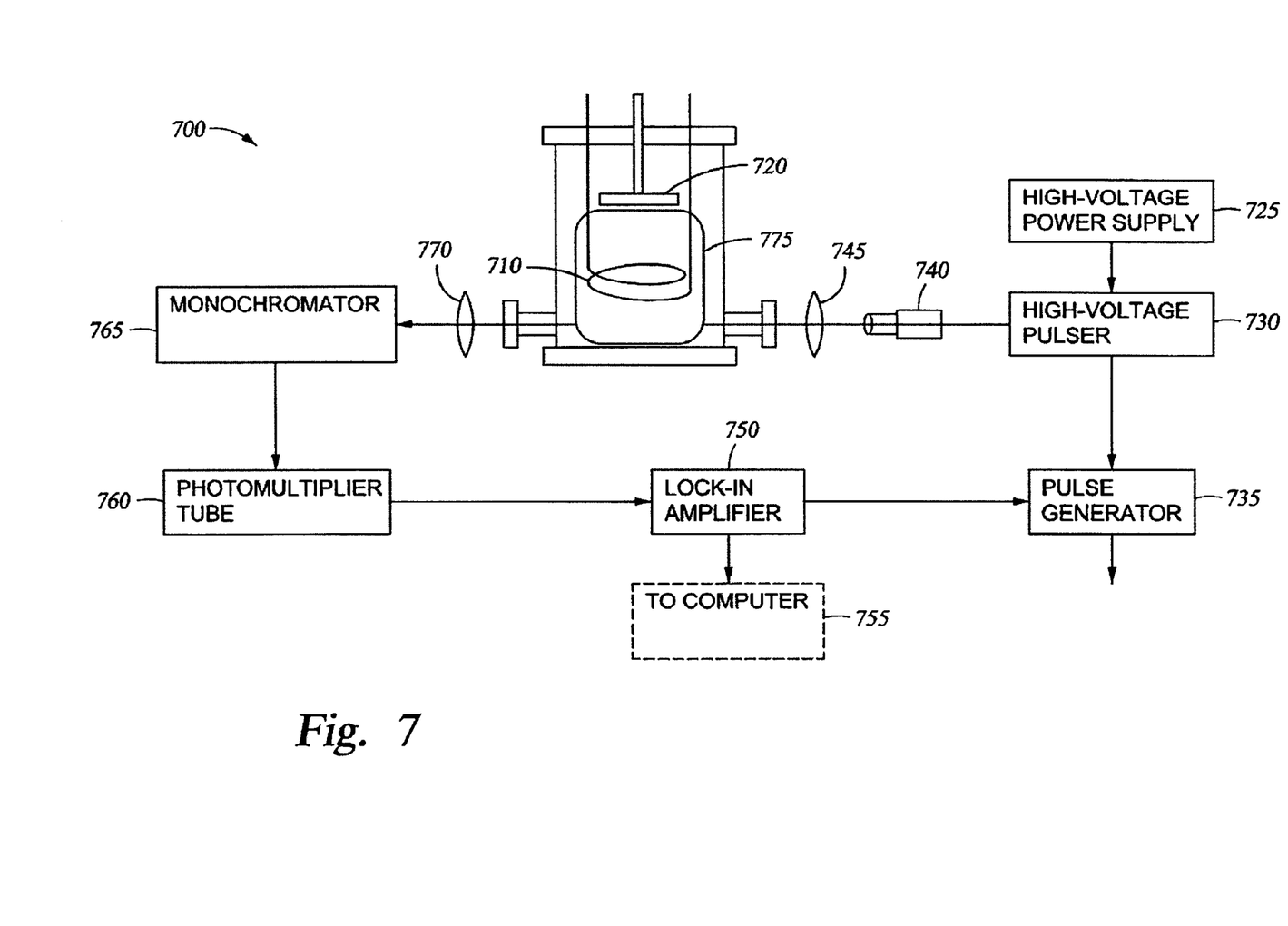
FIG. 7 shows another exemplary embodiment of a plasma chamber that may be used for the nano-pantography system.

FIG. 7 illustrates another exemplary embodiment of another plasma chamber that may be used for the nano-pantography system, shown generally at 700. System 700 is suitable for creating Ni nano-deposits. System 700 may receive nickel target 720 and includes nickel internal coil 710. System 700 includes high-voltage power supply 725 to provide power to high-voltage pulser 730. High voltage pulser 730 is connected to nickel lamp 740 and pulse generator 735. Nickel lamp 740 may emit a beam through lens 745 into ion beam source region 775 and through lens 770 to monochromator 765. Monochromator 765 is an optical device that transmits a selectable narrow band of wavelengths of light chosen from a wider range of wavelengths available at the input, e.g., beam emitted via lens 770. Monochromator 765 is connected to photomultiplier tube 760. Photomultiplier tube 760 detects the light signal transmitted by monochromator 765 and multiplies this signal. Both pulse generator 735 and photomultiplier tube 760 may be connected to lock-in amplifier 750. Amplifier 750 can extract the desired signal from the possible noise of the environment. Amplifier 750 is, in turn, connected to computer 755. Computer 755 may transmit and receive signals to and from system 700 for control and data collection purposes.

Figure 8A:
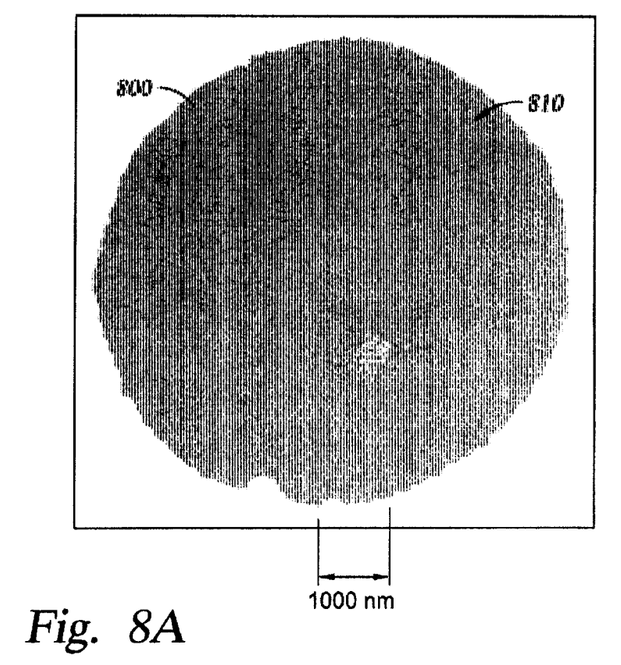
FIG. 8 shows a SEM image of nano-deposits created by the system shown in FIG. 7.
Figure 8B:
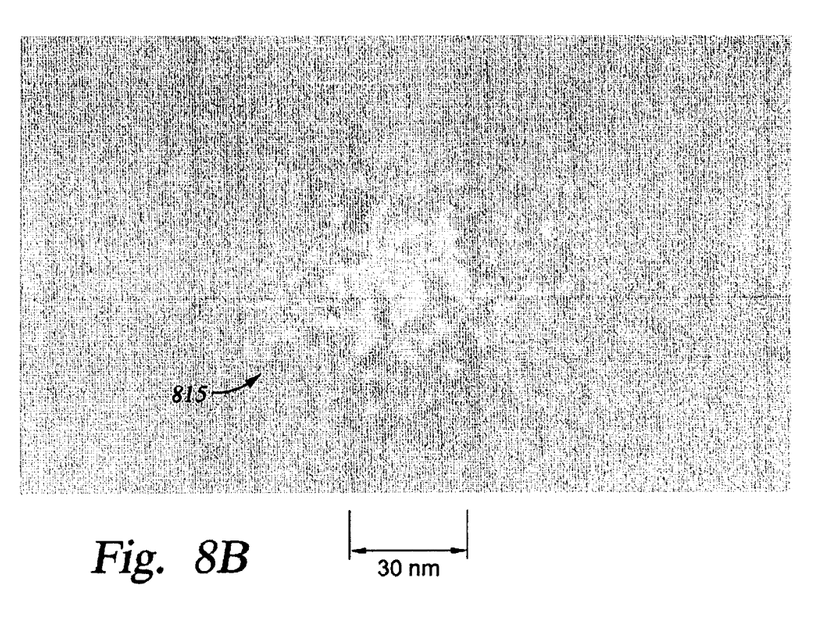
Figure 9A:
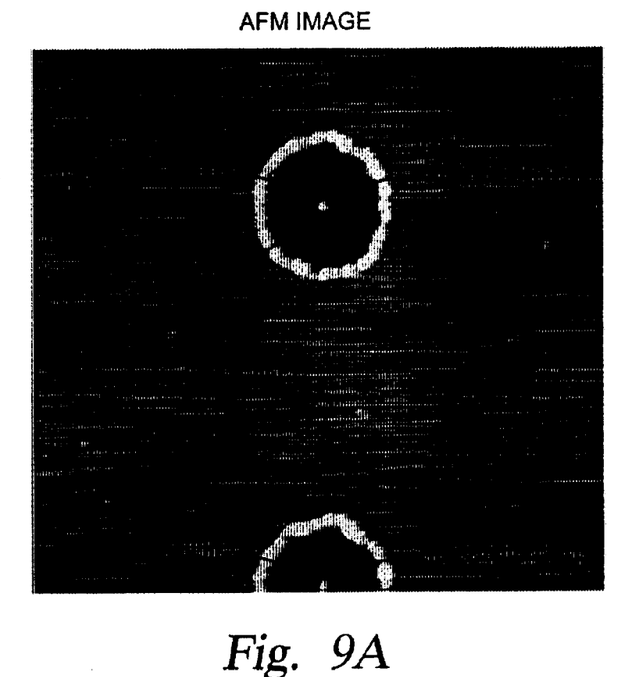
FIGS. 9a-b show atomic force microscopy (AFM) and SEM images of nano-deposits created by the system shown in FIG. 7.
Figure 9B:
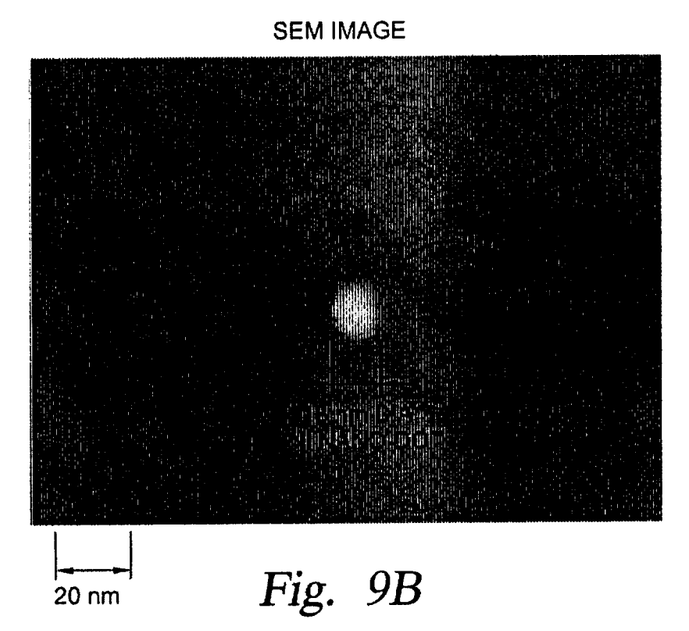

In this deposition mode, both the Ni internal coil 710 and Ni target 720 are sputtered by $Ar^+$ to produce Ni atoms, a fraction of which become ionized. The SEM and atomic force microscopy (AFM) images of the Ni deposits are illustrated in FIGS. 8 and 9. FIG. 8a shows a SEM of a 750 nm diameter single lens 800 with a Ni nano-deposit 815 shown inside area 810. FIG. 8b shows an expanded view of Ni nano-deposit 815. For the example depicted in FIGS. 8a-b, the plasma was run under conditions that maximized the concentration of Ni and $Ni^+$ in accordance with the spectroscopic diagnostics. In this example, the ion landing energy was kept low (20 eV) to minimize sputtering by $Ar^+$, which is present at higher fluxes than Ni+. For this example, the ion energy was 200 eV, $V_m=197$ V, and $V_{sub}=180$ V. The nano-deposits appear to be a continuous film of approximately 40 nm diameter surrounded by a region of smaller nuclei. FIGS. 9a and 9b show AFM and SEM images, respectively, of other examples of Ni nanodots 900 deposited in accordance with the present invention. A smaller Ni nanodot 910, with a diameter of 13 nm, is shown in FIG. 9b.

Figure 10:
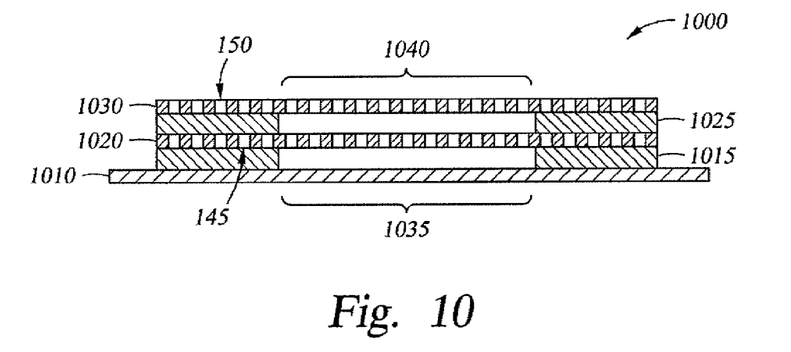
FIG. 10 shows an exemplary embodiment of a multi-electrode lens array of the nano-pantography system.

FIG. 10 illustrates a schematic view of another exemplary embodiment of the lens structure of the nano-pantography system, indicated generally at 1000. Double lens structure 1000, located on the surface of substrate 1010, includes two stacked lens sections. A first section of double lens structure 1000 includes spacer 1015 and grid 1020. Grid 1020 includes an array of holes 145. Spacer 1015 contains aperture 1035. The second section of double lens structure 1000 includes spacer 1025 and grid 1030. Grid 1030 includes an array of micro-holes 150. Spacer 1025 contains aperture 1040. Preferably, aperture 1035 aligns with aperture 1040 in shape, dimension and positioning. Similarly, array of micro-holes 145 and 150 preferably align with each other in shape, dimension, and positioning.

In one example of creating double lens structure 1000, a p-type highly doped silicon substrate (substrate 1010) may be covered by a 100 um thick plastic film (spacer 1015) containing a 0.5 cm hole (aperture 1035). This sheet may be covered with a metal grid (grid 1020) with an array of 150 µm holes in it (array of holes 145). A second 100 µm thick plastic film (spacer 1025) with a 0.5 cm hole (aperture 1040) may be placed over the grid (grid 1020) and aligned with the 0.5 cm hole on the first plastic film (aperture 1035). A second metal grid (grid 1030) with the same size hole and hole pattern (array of holes 150) as the bottom grid (grid 1020) may be positioned on the top of the second spacer (spacer 1025) and the micro-holes in this grid (array of holes 150) may be aligned with counterparts in the first grid (array of holes 145) under an optical microscope. This assembly may be placed into a vacuum chamber with a pressure of $4\times10^{-5}$ torr and a 200 eV Ni ion beam extracted from a $Ni^+$-containing plasma may be directed at the assembly. The voltages on the substrate, first grid and second grid may be set at 180 V, 190.4 V and 150 V respectively. After 3 hours of processing, both the grids and the plastic spacers may be removed. SEM measurements may be subsequently taken on the bare silicon substrate to evaluate the results. The results of this example are shown in FIG. 11.

Figure 11:
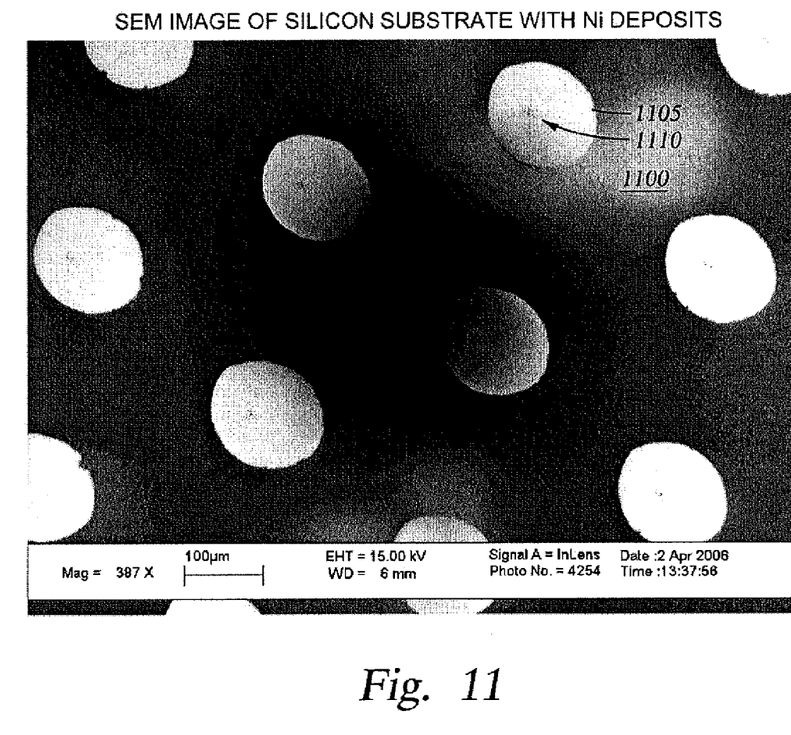
FIG. 11 shows an SEM image of nano-deposits created using the system shown in FIG. 10.

FIG. 11 is a SEM image of an exemplary embodiment of the silicon substrate 1100 with Ni deposits 1110. The bright oval-shaped hole array 1105 is the imprint of holes on the grid and the contrast was most likely due to the surface modification of energetic neutrals accompanying the ion beam. In addition, the holes 1105 may not be perfectly circular due to possible slight misalignments of the micro-holes of the two grids. Close to the center of each hole imprint 1105 is a Ni deposit 1110 with a diameter of approximately 10 µm and a height of approximately 10 nm, as measured by AFM.

The present nano-pantography process has been described for creating nanodots and etching patterns on the surface of a substrate, and it will be apparent to one skilled in the relevant arts that the system and method of the present invention allows for the creation of complex formations including, but not limited to nanowires, nanotubes, nanodevices and nanocircuits. Furthermore, the available surface area of the micro-lens array may be utilized to incorporate larger scale circuitry to address and control the formations, such as nanodevices and nanocircuits, created within the holes of the micro-lens array.

Although the foregoing invention has been described in detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for creating a plurality of substantially uniform nano-scale features in a substantially parallel manner comprising the steps of:

providing an array of micro-lenses coupled to a substrate having a surface, wherein each micro-lens comprises a hole such that the hole defines a bottom that corresponds to a portion of the surface of the substrate;

providing a flux of charged particles to the micro-lens array;

substantially focusing the flux of charged particles at selected focal points on the substrate corresponding to the bottom of the holes of the micro-lens array; and providing a plurality of substantially uniform nanometer sized features on the surface of the substrate in a substantially parallel manner.

2. The method of claim 1, further comprising a step of displacing locations of the focal points on the surface of the substrate.

3. The method of claim 2, wherein providing a flux of charged particles to the micro-lens array further comprises a step of providing a flux of charged ions.

4. The method of claim 3, wherein the step of providing a flux of charged ions further comprises a step of providing a flux of positive ions.

5. The method of claim 4, wherein the step of providing a flux of positive ions further comprises steps of:

placing the substrate under vacuum;

providing a pulsed plasma; and extracting a beam of positive ions from the pulsed plasma.

6. The method of claim 5, wherein providing an array of micro-lenses further comprises a step of providing an array of micro-lenses comprising a conducting layer and an insulating layer.

7. The method of claim 6, further comprising a step of providing a selected voltage between the conducting layer of the micro-lens array and the substrate.

8. The method of claim 7, further comprising a step of varying an orientation of the flux of positive ions to an axis perpendicular to the surface of the substrate.

9. The method of claim 8, wherein the step of varying the orientation of the flux of positive ions to the axis perpendicular to the surface of the substrate further comprises a step of tilting the substrate at one or more selected angles.

10. The method of claim 9, further comprising a step of providing a selected gas operable to etch the surface of the substrate in combination with the flux of positive ions.

11. The method of claim 10, wherein providing a plurality of substantially uniform nanometer sized features on the surface of the substrate in a substantially parallel manner further comprises a step of etching the surface of the substrate at the focal points.

12. The method of claim 9, wherein providing a plurality of substantially uniform nanometer sized features on the surface of the substrate in a substantially parallel manner further comprises a step of depositing a first selected material on the surface of the substrate at the focal points.

13. The method of claim 12, wherein depositing the first selected material on the surface of the substrate at the focal points further comprises depositing a selected ion on the surface of the substrate at the focal points.

14. The method of claim 13, wherein the selected ion reacts with the substrate to form a second selected material on the surface of the substrate at the focal points.

15. The method of claim 13, further comprising a step of providing a selected gas operable to deposit the first selected material on the surface of the substrate in combination with the flux of positive ions.

16. The method of claim 12, further comprising a step of etching the surface of the substrate at the focal points.

17. The method of claim 12, further comprising a step of removing a portion of the nanometer sized features.

18. The method of claim 17, further comprising a step of providing a substantially unfocused ion beam.

19. The method of claim 12, wherein the step of depositing the first selected material further comprises a step of depositing a metal ion on the surface of the substrate at the focal points.

20. The method of claim 19, wherein providing a flux of positive ions to the micro-lens array further comprises providing a flux of metal ions.

21. The method of claim 1, wherein providing a flux of charged particles further comprises a step of providing a flux of electrons.

* * * * *

UNITED STATES PATENT AND TRADEMARK OFFICE
CERTIFICATE OF CORRECTION

| | | |
|---|---|---|
| PATENT NO. | : 7,883,839 B2 | Page 1 of 1 |
| APPLICATION NO. | : 11/633233 | |
| DATED | : February 8, 2011 | |
| INVENTOR(S) | : Vincent M. Donnelly et al. | |

It is certified that error appears in the above-identified patent and that said Letters Patent is hereby corrected as shown below:

Column 1, lines 12-14: replace [This invention was made with government support under University of Houston account number 5-51-956 awarded by the National Science Foundation] with "This invention was made with government support under Grant No. DMI-0303790 awarded by the National Science Foundation. The government has certain rights in the invention."

Signed and Sealed this
Twentieth Day of September, 2011

David J. Kappos
*Director of the United States Patent and Trademark Office*